(12) United States Patent
Kobayashi

(10) Patent No.: US 6,922,876 B2
(45) Date of Patent: Aug. 2, 2005

(54) SEAT BELT COVER

(76) Inventor: Kyozo Kobayashi, 10-4, Sakurashinmachi 2-chome, Setagaya-ku, Tokyo (JP)

(*) Notice: Subject to any disclaimer, the term of this patent is extended or adjusted under 35 U.S.C. 154(b) by 0 days.

(21) Appl. No.: 09/938,525

(22) Filed: Aug. 27, 2001

(65) Prior Publication Data

US 2002/0023324 A1 Feb. 28, 2002

(30) Foreign Application Priority Data

Aug. 25, 2000 (JP) ........................ 2000-255041

(51) Int. Cl.⁷ .................................. A44B 11/25
(52) U.S. Cl. ................................................ 24/633
(58) Field of Search .................... 24/629, 633, 625, 24/634, 641, 642, 306

(56) References Cited

U.S. PATENT DOCUMENTS

| 4,057,181 | A | | 11/1977 | Finnigan | |
|---|---|---|---|---|---|
| 4,699,401 | A | * | 10/1987 | Saenz | 224/602 |
| 4,786,080 | A | * | 11/1988 | Jay | 280/808 |
| 5,108,152 | A | * | 4/1992 | Reilly et al. | 297/397 |
| 5,161,824 | A | * | 11/1992 | Li | 280/801.1 |
| 5,312,159 | A | * | 5/1994 | Essa et al. | 297/482 |
| 5,335,957 | A | | 8/1994 | Golder | |
| 5,387,028 | A | * | 2/1995 | Fulgenzi et al. | 297/467 |
| 5,542,590 | A | * | 8/1996 | Pfitzenmaier | 150/102 |
| 5,566,871 | A | * | 10/1996 | Weintraub | 2/268 |
| 5,573,306 | A | * | 11/1996 | Galloway et al. | 24/23 W |
| RE36,587 | E | * | 2/2000 | Tanaka et al. | 280/733 |
| 6,105,219 | A | * | 8/2000 | Beadle | 24/579.11 |
| 6,138,331 | A | * | 10/2000 | Powers | 24/306 |
| 6,168,195 | B1 | * | 1/2001 | Okazaki et al. | 280/733 |
| 6,273,467 | B1 | * | 8/2001 | Berke et al. | 280/751 |
| 6,409,271 | B1 | * | 6/2002 | Caramanis | 297/482 |

FOREIGN PATENT DOCUMENTS

| GB | 1 565 644 | | 4/1980 |
|---|---|---|---|
| GB | 2 164 835 | | 4/1986 |
| GB | 2236794 | A * | 4/1991 |
| JP | 62-56357 | | 4/1987 |
| JP | 7-315160 | | 12/1995 |
| JP | 2000-142313 | | 5/2000 |

* cited by examiner

*Primary Examiner*—Robert J. Sandy
*Assistant Examiner*—Andre'L. Jackson
(74) *Attorney, Agent, or Firm*—Oblon, Spivak, McClelland, Maier & Neustadt, P.C.

(57) ABSTRACT

A seat belt cover comprising a flat tubular member through which a seat belt of a motor vehicle is passed to be covered therewith, wherein, the flat tubular member has i) a slit-shaped opening provided at its lower end and having a width larger than the width of a through-tongue and ii) a slit-shaped opening provided at its upper end and having a width which is enough to pass the seat belt but not enough to pass the through-tongue. Also disclosed is a seat belt cover provided with a pocket for, e.g., a cellular phone on the outside. The former seat belt cover can prevent the friction of a seat belt with clothes to keep the shoulder or breast of a coat or jacket from becoming shiny and wearing. The latter seat belt cover enables, e.g., safety driving in talking over the cellular phone during the driving of a motor vehicle.

10 Claims, 7 Drawing Sheets

SEAT BELT COVER

BACKGROUND OF THE INVENTION

1. Field of the Invention

This invention relates to a seat belt cover of a motor vehicle.

2. Description of the Prior Art

Seat belts of motor vehicles hold drivers and passengers firmly to seats in collisions of the motor vehicles to prevent the drivers and passengers from colliding against steering wheels, instrument panels, windshields and so forth by inertia, so as to be kept from being injured or be less injured, and are obliged to be fastened in driving.

However, especially when a driver operates a motor vehicle, the driver moves his or her body up and down, back and forth, and right and left, when a seat belt the driver uses will be wound up or off according to the driver's movement. Hence, because of friction of the seat belt with clothes, parts coming into contact with the seat belt, in particular, parts on the shoulder or breast of a coat or jacket may become shiny and wear.

To prevent this, the part of a seat belt which comes into contact with, in particular, the shoulder or breast of clothes is covered with a seat belt cover. Conventionally, this seat belt cover is fitted to the seat belt merely in the shape of a flat tube. Hence, when the seat belt is unused and it is wound up on a retractor, and if the upper end of the seat belt cover stops at the mouth of a slip guide, its through-tongue is still pulled and hence the seat belt cover becomes loose in bellows or the through-tongue stops without reaching the preset position. As the result, the seat belt is not just received into its holder at the preset position when it is unused, also damaging the beauty.

In addition, in recent years, cellular phones inclusive of PHS are in wide use. Talking over the phone with someone during the driving of a motor vehicle compels one-handed driving or brings about careless driving, and may cause a traffic accident.

SUMMARY OF THE INVENTION

Under the circumstances, an object of the present invention is to provide a seat belt cover which can prevent the friction of a seat belt with clothes to keep the shoulder or breast of a coat or jacket from becoming shiny and wearing, and which, when the seat belt is unused and it is wound up on a retractor, can receive the through-tongue into the cover so that the seat belt cover may by no means become loose in bellows or the through-tongue may by no means stop without reaching the preset position, and also to provide a seat belt cover which enables safety driving without causing the hand to be restrained by talking over the cellular phone during the driving of a motor vehicle.

As a result of extensive studies, the present inventor has discovered that a seat belt cover constructed as described below can solve the above problems, and has accomplished the present invention.

More specifically, the present invention first provides a seat belt cover comprising a flat tubular member through which a seat belt of a motor vehicle is passed to be covered therewith, wherein the flat tubular member has i) a slit-shaped opening provided at its lower end and having a width larger than the width of a through-tongue and ii) a slit-shaped opening provided at its upper end and having a width which is enough to pass the seat belt but not enough to pass the through-tongue.

The present invention second provides a seat belt cover provided with a pocket on the outside surface thereof.

DESCRIPTION OF THE PREFERRED EMBODIMENT

The present invention is described below in detail.

Seat Belt Cover

Figure 1:
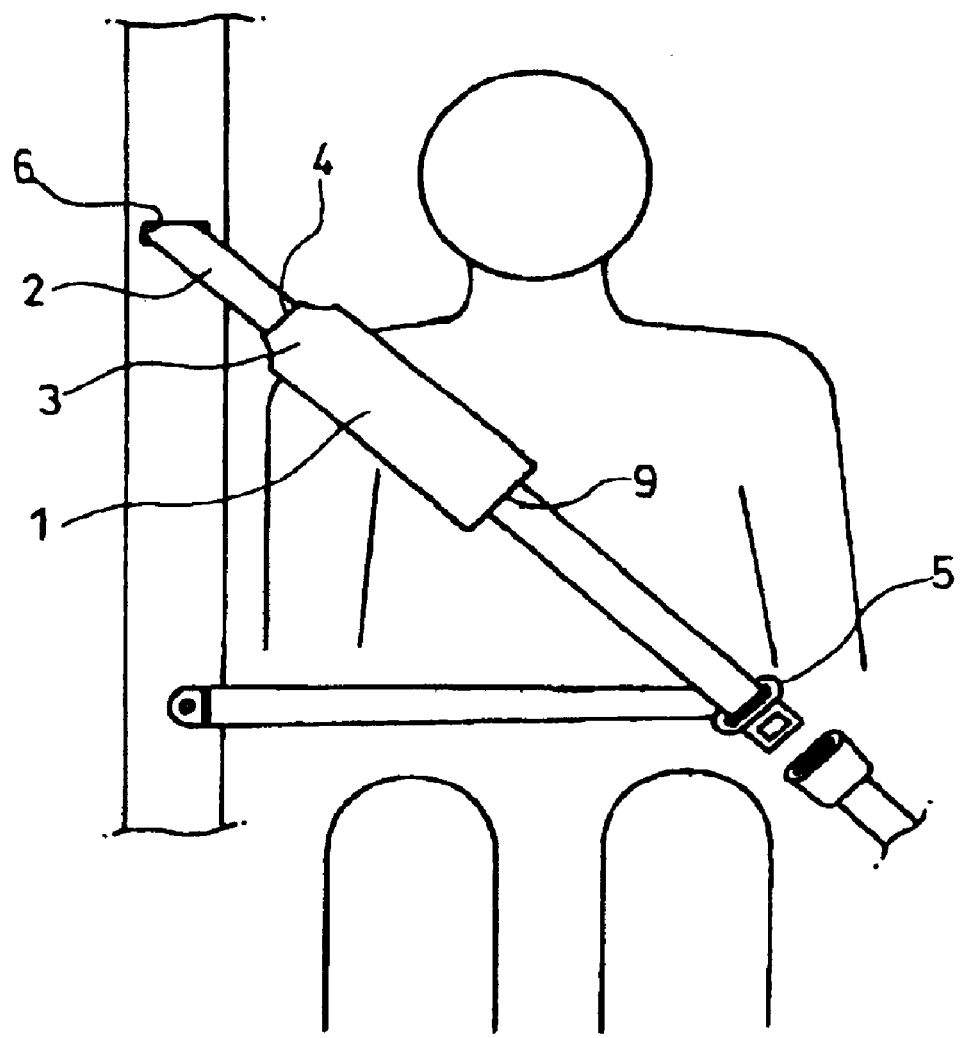
FIG. 1 is a schematic view showing how the seat belt cover of the present invention stands when fitted to a seat belt.

FIG. 1 is a schematic view showing how a seat belt cover 1 of an embodiment according to the present invention stands when fitted to a seat belt 2. The seat belt cover 1 is a substantially flat tubular member. The substantially flat tubular member has a lower end 9 having a width larger than the width of a through-tongue 5. The substantially flat tubular member has an upper portion 3 narrowed down taperingly to the end, and has an upper end having a width which is larger than the width of the seat belt 2 and is smaller than the width of the through-tongue 5 so as to pass the seat belt 2 but not to pass the through-tongue 5. However, the width of the upper end 4 may preferably be set to be only a little larger than the width of the seat belt so that the seat belt cover does not slide down when fitted to the seat belt. When a driver or a passenger moves his or her body and the seat belt is wound up or wound off according to the movement, the seat belt moves inside the seat belt cover but the seat belt cover per se does not move and stay at the position set on the body. Therefore, friction between the seat belt cover and the clothes doe not occur.

Figure 2:
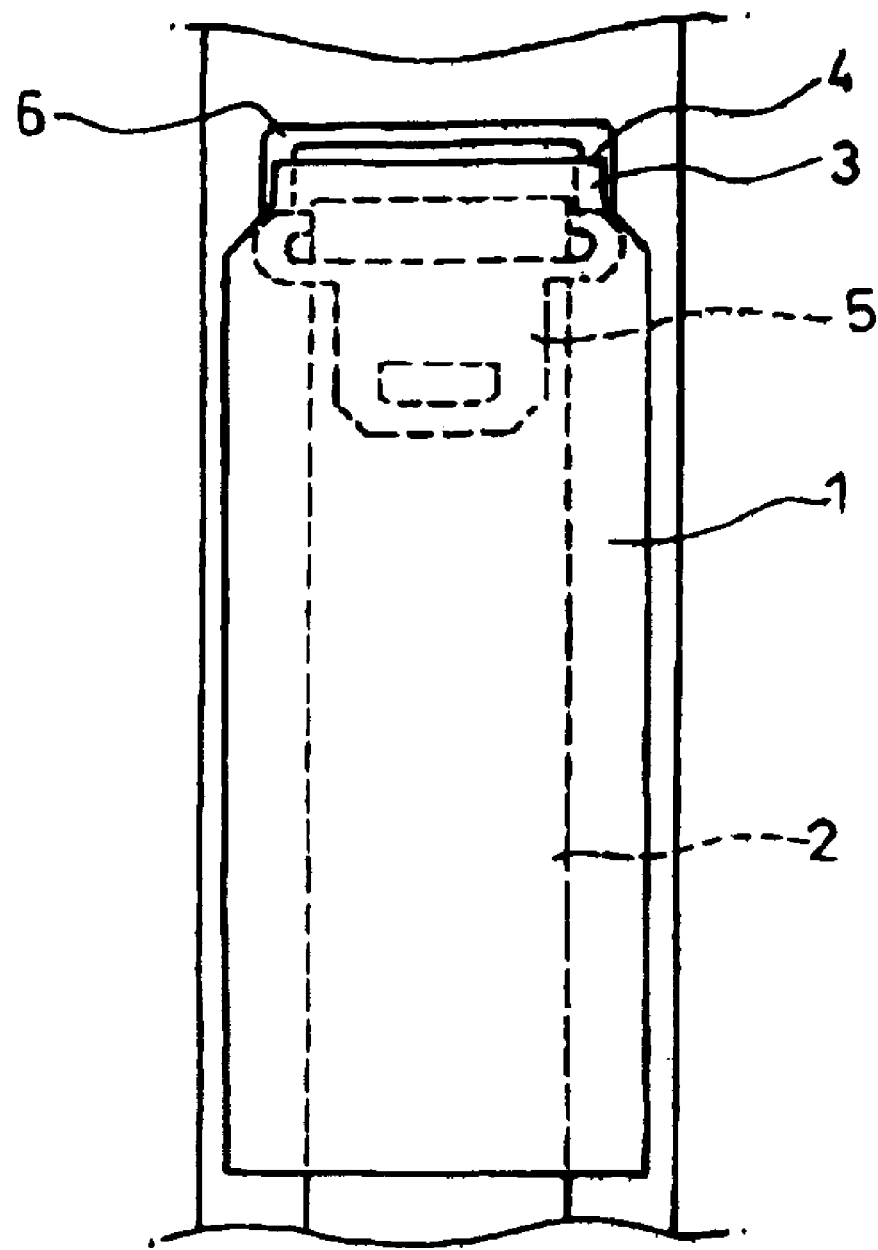
FIG. 2 is a schematic view showing how the seat belt stands received into the seat belt cover when the seat belt is unused.

When the seat belt is unused, the seat belt 2 is wound up on a retractor (not shown) provided in the body of a car. As shown in FIG. 2, the upper end 4 of the seat belt 1 stops at a slip guide 6 and at the same time the through-tongue 5 is received into the interior of the seat belt cover 1. Thus, the through-tongue 5 can stop at the preset position without making the seat belt cover become loose in bellows.

Figure 3:
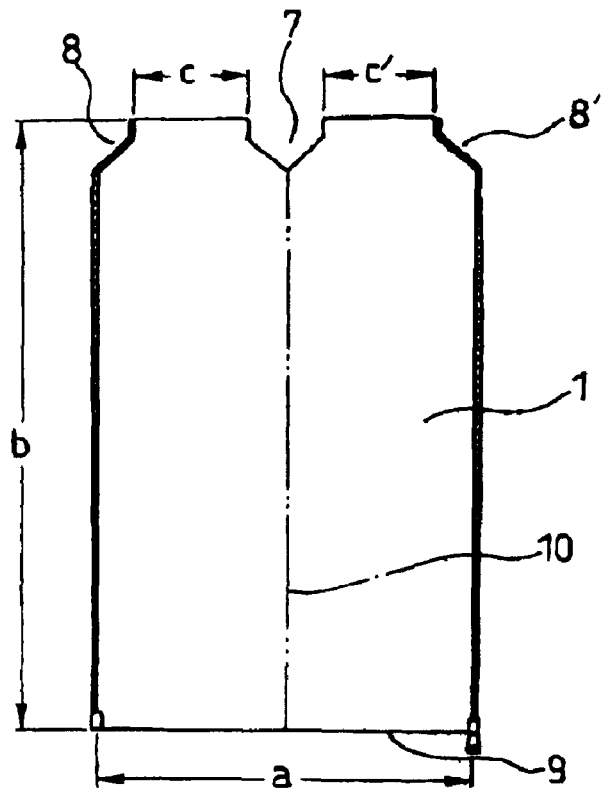
FIG. 3 is an unfolded view of the inside of the seat belt cover of the present invention.

FIG. 3 is an unfolded view of the inside of the seat belt cover 1 of the present invention. As shown in FIG. 3, a substantially rectangular material has one short side having a width a which is larger than the two-fold of the width of the through-tongue 5, and has the other short side provided with a notch 7 at the middle and notches 8 and 8' on the both ends. Its portions c and c' excluding the notch 7 and notches 8 an 8' each have a width which is larger than the width of the seat belt 2 and is smaller than the width of the through-tongue 5. The substantially rectangular material has a long side having a length b which is larger than the length over which the seat belt cover comes into contact with the shoulder and breast, which may preferably be about 30~50 cm. The substantially flat tubular member is formed by folding the substantially rectangular material inward along a middle line 10, joining or stitching the edges of the notch 7 at the middle, providing, e.g., an open-type slide fastener (zipper) or a Velcro closure along the both side edges, and closing or joining it from the lower end to the upper end or from the upper end to the lower end.

Figure 7:
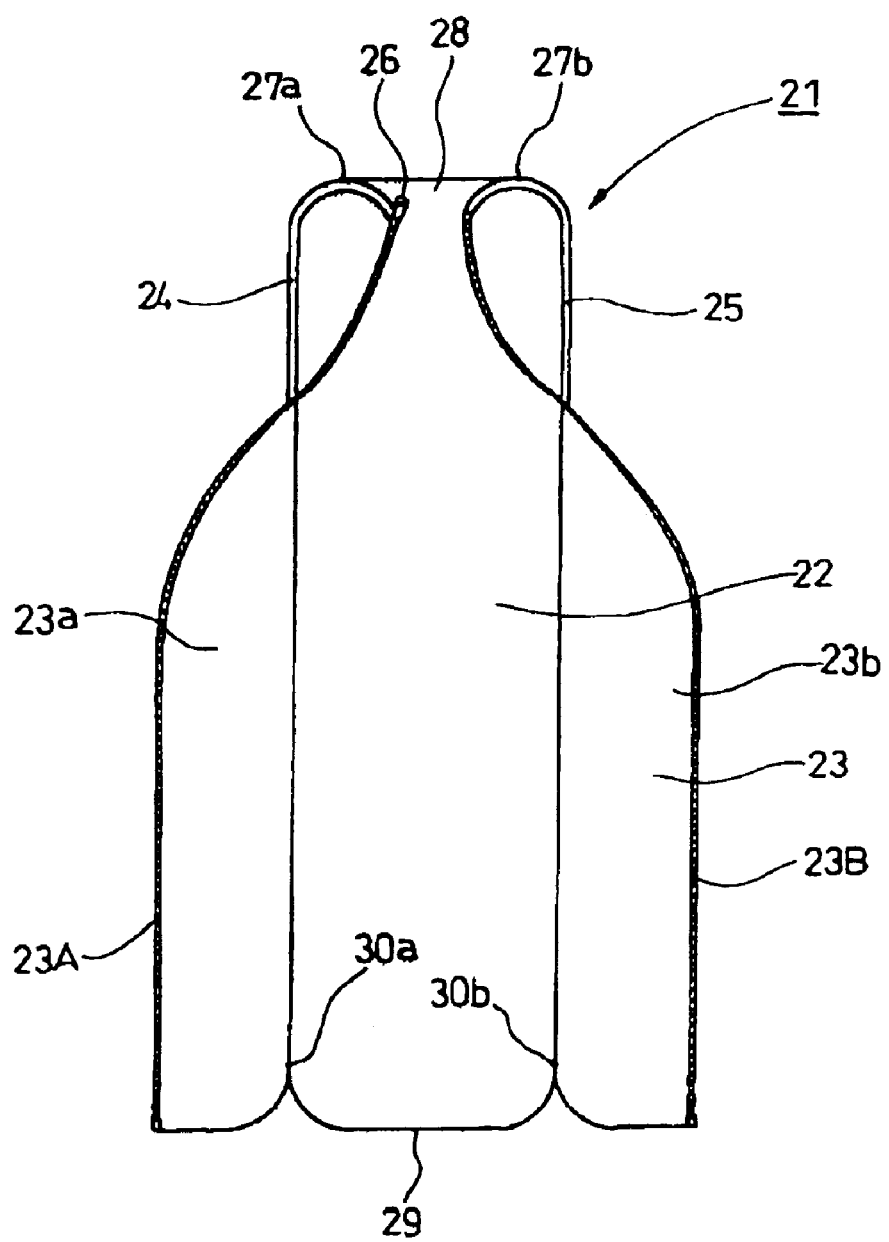
FIG. 7 is an unfolded view showing another embodiment of the seat belt cover.
Figure 8:
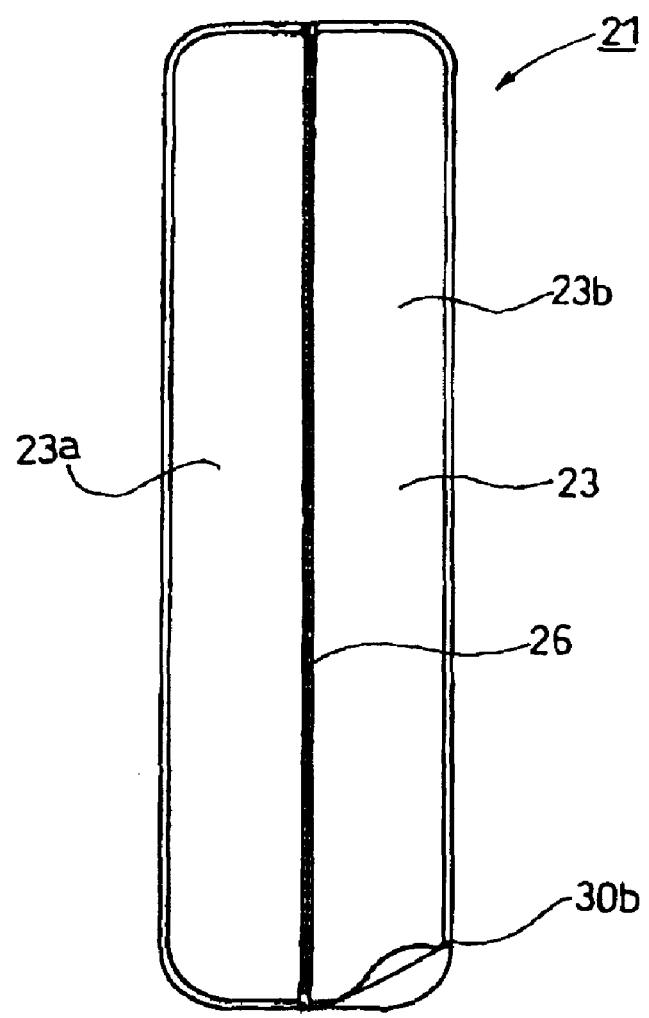
FIG. 8 is a view showing how the seat belt cover shown in FIG. 7 stands when zipped up.

A preferred embodiment of the seat belt cover of the present invention is shown in FIGS. 7 and 8. FIG. 7 shows a state in which the seat belt cover is zipped down, and FIG. 8 a state in which the seat belt cover is zipped up.

In FIGS. 7 and 8, a flat-tubular seat belt cover 21 comprises an outside (i.e., the side on which the seat belt cover does not come into contact with the shoulder or breast when used) beltlike member 22 and an inside (i.e., the side on which it comes into contact with the shoulder or breast when used) beltlike member 23. The inside beltlike member 23 comprises two beltlike submembers 23a and 23b which are separable from each other along a line extending in the longitudinal direction, and preferably along the middle line, so as to be detachable from the seat belt. One side end 24 of the inside beltlike member is joined to one side end of the outside beltlike member and the other side end 25 of the inside beltlike member is joined to the other side end of the outside beltlike member. A flat tube is thus constructed. On the other side ends 23A and 23B of the beltlike submembers 23a and 23b, respectively, a zip-up or zip-down operable slide fastener 26 is provided so that the seat belt cover can readily be attached to or detached from the seat belt.

In the embodiment shown in FIGS. 7 and 8, the side ends 24 and 25 of the inside beltlike member 23 are joined to the corresponding side ends of the outside beltlike member 22 over almost the whole length of each side end. They are further so joined as to extend partly to rounded upper end from their upper portions and reach the positions 27a and 27b on the upper end. Thus, when the inside beltlike member 23 is zipped up, the width of a slit-shaped opening 28 formed at the upper end is so set as to be larger than the width of the seat belt and be smaller than the crosswise width of the through-tongue. Hence, the seat belt can pass through this opening but the through-tongue is stopped inside this opening.

In the present invention, a slit-shaped opening made at the lower end of the flat-tubular seat belt cover is notched upward at the right-and-left both ends of the opening. Notching the lower-end opening at the both ends in this way brings about an advantage that the seat belt and the through-tongue, in particular, the through-tongue can more smoothly come into or come out of the seat belt cover when the seat belt is fastened or unfastened in the state the seat belt cover is kept fitted to the seat belt. The length of the notches in the longitudinal direction of the seat belt cover is preferably in a range of 3 to 6 cm.

In this respect, in the embodiment shown in FIGS. 7 and 8, the side ends 24 and 25 of the inside beltlike member 23 are so joined to the side ends of the outside beltlike member 22 as to stop at positions 30a and 30b which are a little upper than the lower end 29. Thus, when the slide fastener 26 is operated to zip up the seat belt cover into a flat-tubular member, the slit-shaped opening formed at the lower end has such a form that the opening has been notched at right and left.

The seat belt cover may be kept fitted to the seat belt, or may be kept detached when unused.

The seat belt cover may be made of any material as long as it can retain its shape when the through-tongue is received into it, and is a non-frictional material. For example, it may include thick cloths such as felt, and synthetic leather, leather and quilting. Also, the seat belt cover may be made of a non-frictional material on the inside, i.e., the side coming into contact with the shoulder and breast and a shape-retentive material on the outside, i.e., the non-contact side. A cushioning material, e.g., a urethane foam may also be put into at least the beltlike member on the contact side so that the fit feeling when the seat belt is fastened can be improved. Some people, especially women, may have a feeling of being pressed when using a seat belt, or an unpleasant feeling or a feeling of a pain when wearing summer clothes exposing skin partly at shoulder, etc. which is directly brought into contact with the seat belt. However, since the seat belt cover is quite wider than the seat belt and further a cushioning material is incorporated or filled in at least the inside beltlike member of the seat belt cover, not only the unpleasant feeling caused by the direct contact but also the feeling of being pressed and the feeling of a pain are markedly reduced because the pressure is scattered.

It is possible to make various designs on the outside surface of the seat belt cover to thereby enhance fashion-ability.

Seat Belt Cover with Pocket

A seat belt cover used as a base of the seat belt cover with pocket according to the present invention may be the seat belt cover of the present invention described above, or may be a conventional seat belt cover. Anything may be held in the pocket. For example, it may include a cellular phone inclusive of PHS, glasses, a pack of cigarette, a pocketbook, a purse and so forth. A case in which a cellular phone is held in is given in the following description.

Figure 4:
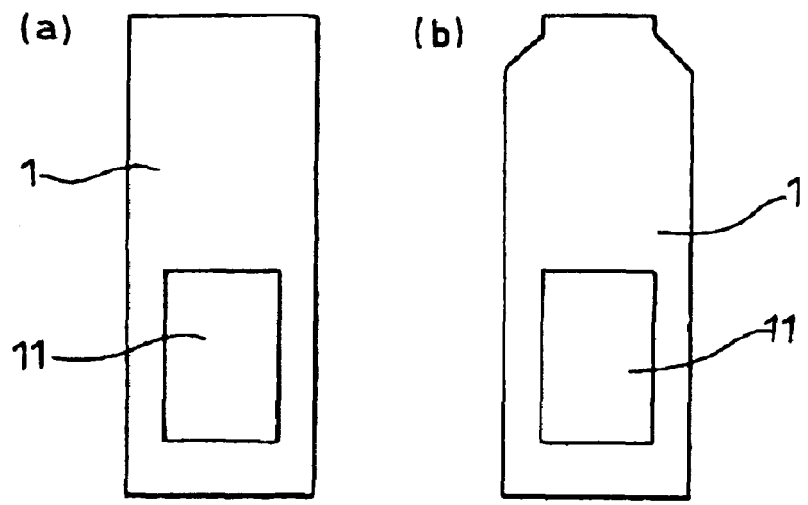
FIG. 4 illustrates schematic plan views each showing how a seat belt cover is provided with a cellular phone-holding pocket.

In FIG. 4, (a) illustrates a schematic plan view showing a seat belt cover with a pocket according to the present invention, comprising a conventional seat belt cover 1 provided with a cellular phone-holding pocket 11.

In FIG. 4, (b) illustrates a schematic plan view showing another seat belt cover with a pocket according to the present invention, comprising the seat belt cover 1 of the present invention described above, further provided with a-phone-holding pocket 11. The cellular phone-holding pocket 11 may have such a size that it can receive a cellular phone. As materials for the pocket, there are no particular limitations thereon. The same materials as those for the seat belt cover may be used. Instead, a net-like or mesh-like material may be used as a material of the pocket and a cellular phone may be kept inserted in the pocket, where the driver can talk over the phone without any interruption of a voice due to the material of which the pocket is made, thereby enabling safety driving without causing the hand to be restrained by talking over the phone during the driving of a motor vehicle.

Figure 5:
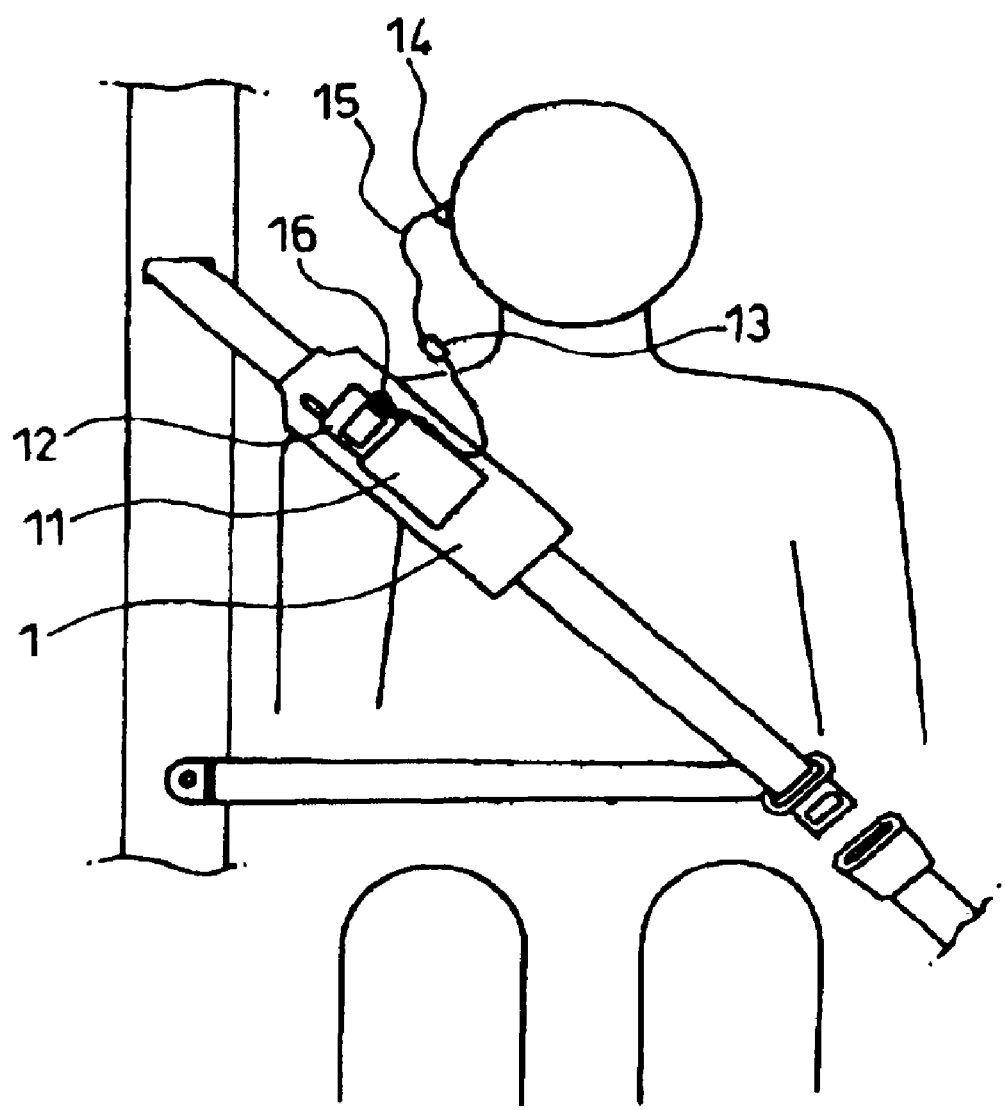
FIG. 5 is a view showing how a driver talks over a cellular phone put into the cellular phone-holding pocket provided on the seat belt cover.

FIG. 5 is a view showing how a driver talks over a cellular phone 12 put into the cellular phone-holding pocket 11 provided on the seat belt cover 1. Here, a connecting terminal 16 on one end of an extension cord 15 provided with a microphone 13 and an earphone 14 is inserted and connected to a microphone-earphone jack of a cellular phone 12, and the microphone 13 is so set as to come near to driver's mouth. This enables safety driving without causing the hand to be restrained by talking over the phone during the driving of a motor vehicle.

Figure 6:
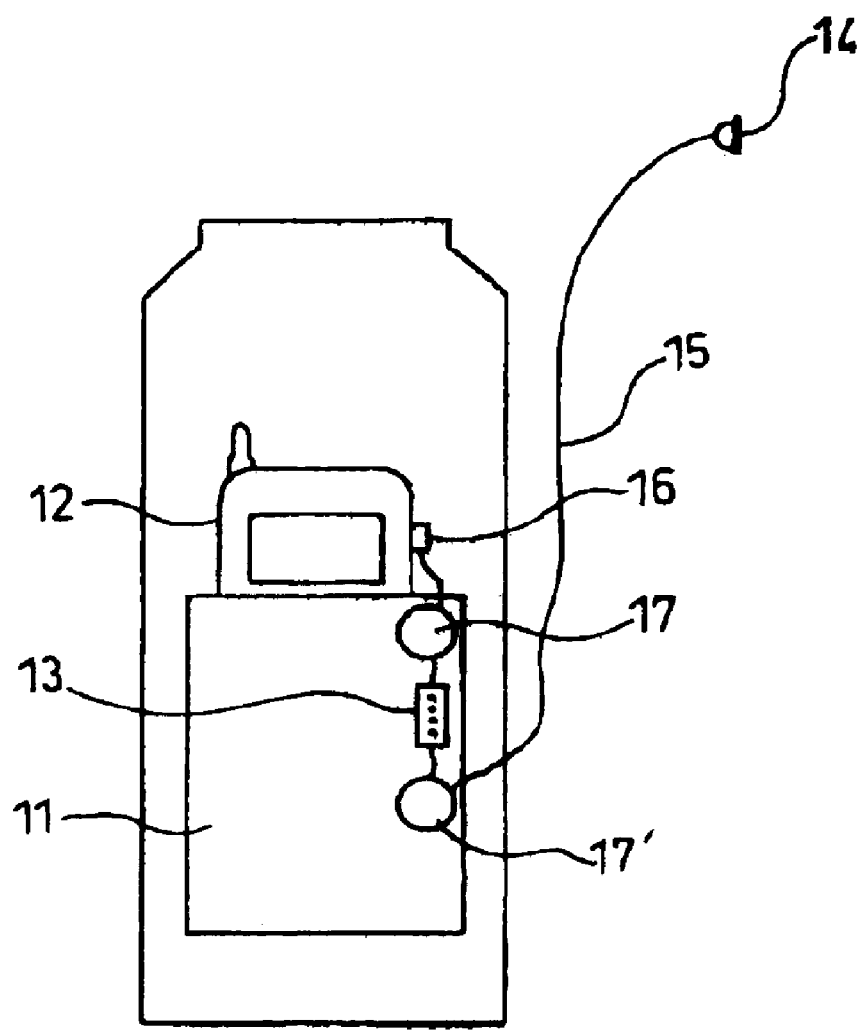
FIG. 6 is a view showing another cellular phone which stands put into the cellular phone-holding pocket provided on the seat belt cover.

As the cellular phone used here, it is preferable to use a cellular phone constructed in the following way. That is, as shown in FIG. 6, in an extension cord 15 having a microphone 13 and an earphone 14 and inserted and connected to the main body of a cellular phone 12 through a connecting terminal 16, a wind-up device 17 with a stopper is previously provided between the connecting terminal 16 and the microphone 13, and another wind-up device 17' with a stopper between the microphone 13 and the earphone 14. The wind-up device 17 with a stopper is operated to adjust the distance between the connecting terminal 16 and the microphone 13 so that the microphone 13 may lie on the seat belt cover 1 (i.e., on the breast) and may just come to the position where the voice can be picked up. The wind-up device 17' with a stopper is also operated to previously remove any looseness of the extension cord between the microphone 13 and the earphone 14. Thus, the driver can clearly talk over the phone, and the extension cord 15 can be prevented from tangling, to more promise safety.

The wind-up device with a stopper is meant to be a device incorporated with a mechanism which can automatically wind up the cord and moreover can arbitrarily stop winding up so that the cord wound back can be in the desired length. It is a known and commonly used device used widely in reelers of, e.g., tape measures and vacuum cleaners. An example in which an earphone is provided with such a device is disclosed in Japanese Laid-open Publication (Kokai) No. 10-294984.

As described above, the seat belt cover of the present invention, when fitted to the seat belt, can prevent the friction of the seat belt with a coat or jacket and can keep the shoulder or breast of the coat or jacket from becoming shiny and worn. Also, when the seat belt is unused and it is wound up on the retractor, the seat belt cover can receive the through-tongue into the cover so that the seat belt cover may by no means become loose in bellows or the through-tongue may by no means stop without reaching the preset position. Hence, the seat belt can just be received into the holder at its preset position, and also the beauty is not damaged.

What is claimed is:

1. A seat belt cover comprising:
   an outside beltlike member having a top end, a bottom end disposed away from the top end along a longitudinal axis, and first and second connecting edges disposed between the top and bottom ends and disposed opposite one another;
   a left beltlike submember connected to the first connecting edge;
   a right beltlike submember adapted to form a partially closed volume with the outside beltlike member and the left beltlike submember, the right beltlike submember having a bottom end and a top end, the bottom end of the right beltlike submember connected to the second connecting edge of the outside beltlike member at a bottom connecting point disposed a non-zero distance away from the bottom end of the outside beltlike member, and the top end of the right beltlike submember connected to the second connecting edge of the outside beltlike member adjacent the top end of the outside beltlike member at a top connecting point, a distance between the longitudinal axis and the top connecting point being less than a distance between the longitudinal axis and the bottom connecting point,
   wherein the seat belt cover moves relative to the seat belt when the seat belt is wound and unwound.

2. The seat belt cover according to claim 1, further comprising:
   a first cooperating fastener disposed on the left beltlike submember; and
   a second cooperating fastener disposed on the right beltlike submember, the second cooperating fastener adapted to fasten with the left beltlike submember to form the partially closed volume.

3. The seat belt cover according to claim 2, wherein the first and second cooperating fasteners comprises a set of interlocking teeth.

4. The seat belt cover according to claim 3, wherein the left beltlike submember is connected to the first connecting edge of the outside beltlike member a non-zero distance from the bottom end of the outside beltlike member and adjacent the top end of the outside beltlike member.

5. A seat belt cover comprising:
   an outside beltlike member having outside top and bottom ends, and connecting and fastening edges the outside top end disposed away from the outside bottom end along a longitudinal axis, and the outside connecting and fastening edges extending between the outside top and bottom ends and disposed away from one another; and
   an inside beltlike member having inside top and bottom ends, and connecting and fastening edges, the inside top end disposed away from the inside bottom end, the inside connecting and fastening edges extending between the inside top and bottom ends and disposed away from one another, the inside connecting edge connected with the outside connecting edge, and the inside fastening edge adapted to removably fasten with the outside fastening edge to form a partially closed volume,
   wherein a distance between the longitudinal axis and the outside connecting edge adjacent the outside top end is less than a distance between the longitudinal axis and the outside connecting edge adjacent the outside bottom end, and wherein the seat belt cover moves relative to the seat belt when the seat belt is wound and unwound.

6. The seat belt cover according to claim 5, wherein the outside beltlike member is integral with the inside beltlike member.

7. The seat belt cover according to claim 5, wherein the outside beltlike member is separate from the inside beltlike member.

8. The seat belt cover according to claim 5, wherein the inside and outside fastening edges include interlocking teeth adapted to removably fasten with one another to form the partially closed volume.

9. A seat belt cover comprising:
   an outside beltlike member having a top end, a bottom end disposed away from the top end along a longitudinal axis, and first and second connecting edges disposed between the top and bottom ends and disposed opposite one another;
   a left beltlike submember connected to the first connecting edge;
   a right beltlike submember adapted to form a partially closed volume with the outside beltlike member and the left beltlike submember, the right beltlike submember having a bottom end and a top end, the bottom end of the right beltlike submember connected to the second connecting edge of the outside beltlike member adjacent the bottom end of the outside beltlike member at a bottom connecting point, and the top end of the right beltlike submember connected to the second connecting edge of the outside beltlike member adjacent the top end of the outside beltlike member at a top connecting point, a distance between the longitudinal axis and the top connecting point being less than a distance between the longitudinal axis and the bottom connecting point,
   wherein the seat belt cover moves relative to the seat belt when the seat belt is wound and unwound.

10. The seat belt cover according to claim 9, wherein the left beltlike submember is connected to the first connecting edge of the outside beltlike member adjacent the bottom end of the outside beltlike member and adjacent the top end of the outside beltlike member.

* * * * *